United States Patent [19]

Su

[11] 3,862,288

[45] Jan. 21, 1975

[54] CREEP STABILIZATION OF PLASTIC ARTICLES

[75] Inventor: Cheh-Jen Su, Alsip, Ill.

[73] Assignee: Continental Can Company, New York, N.Y.

[22] Filed: June 22, 1973

[21] Appl. No.: 372,556

Related U.S. Application Data

[63] Continuation-in-part of Ser. No. 171,377, Aug. 12, 1971, abandoned.

[52] U.S. Cl. ................................ 264/235, 264/343
[51] Int. Cl. ............................................ B29c 25/00
[58] Field of Search ........... 264/232, 235, 346, 343; 260/85.5 R, 85.5 S

[56] References Cited

UNITED STATES PATENTS

| | | | |
|---|---|---|---|
| 2,373,093 | 4/1945 | Baker | 264/235 |
| 3,317,642 | 5/1967 | Bailey | 264/346 |
| 3,426,102 | 2/1969 | Solak et al. | 260/879 |
| 3,451,140 | 6/1969 | Nakagawa et al. | 264/182 |
| 3,458,617 | 7/1969 | Isley et al. | 264/235 |
| 3,514,512 | 5/1970 | Kikuchi et al. | 264/182 |
| 3,624,196 | 11/1971 | Ball | 264/182 |
| 3,716,606 | 2/1973 | Bazett | 264/235 |

*Primary Examiner*—Donald J. Arnold
*Assistant Examiner*—Gene Auville
*Attorney, Agent, or Firm*—Paul Shapiro; Joseph E. Kerwin; William A. Dittmann

[57] ABSTRACT

A method for imparting creep stabilization to a shaped article fabricated from an amorphous nitrile thermoplastic resin having a first glass transition temperature wherein the article is humidified to a moisture content of at least 1% and the glass transition temperature of the resin is lowered to a second glass transition temperature and the article while in a humidified state is heated to a temperature of 1° to 15°C below the second glass transition temperature for at least 0.5 hour.

6 Claims, No Drawings

CREEP STABILIZATION OF PLASTIC ARTICLES

This application is a continuation-in-part of my copending application Ser. No. 171,377 filed Aug. 12, 1971 now abandoned.

BACKGROUND OF THE INVENTION

1. FIELD OF THE INVENTION

This invention relates to shaped plastic articles and more particularly to a method for stabilizing shaped plastic articles to distortion by elevated internal pressures exerted on the internal walls of the article.

2. PRIOR ART

Thermoplastic materials have already been used for manufacturing containers and in particular bottles which are fabricated by blow molding. The thermoplastic compositions from which the bottles are fabricated are suitable for use from the standpoint of product potability and general mechanical requirements. The use of these bottles for pressurized liquids such as beer and carbonated soft drinks however presents difficulties. Such bottles must be able to withstand fill pressures in the order of 40 psi and up to 100 psi or more in storage when exposed to the sun, warm rooms, car trunks and the like. Attempts have been made to make the bottles useable for pressurized liquids by selecting an extremely thick wall for the bottles or containers. Due to the heavy weight of the raw material required for such plastic bottles however, they are too expensive when compared with glass bottles. When attempts are made to utilize thin wall bottles e.g., wall thicknesses in the range of 20-40 mils, the bottles undergo substantial creep when used for packaging carbonated beverages. The term "creep" as used in the present specification is a term used in the art to characterize the response of the plastic bottle wall to the stress within the closed container due to pressure of the carbonated liquid contained therein and typically consists of an initial elastic-like distortion followed by a continuously increasing deformation with time.

The dimensional stability of the plastic container is important for the commercial packaging of beer and carbonated beverages. Plastic bottles for this application must be able to be stored for weeks at a time without changing dimensions.

It has been found that bottles fabricated from most commercially available thermoplastic resins when used for packaging beer and other carbonated beverages undergo volume expansion due to the phenomenon of creep when subjected to storage conditions. The volume expansion of the bottle leads to a lowering of the fill level to such an extent that the bottle appears underfilled which substantially reduces the saleability of the packaged product to the buying public. To be competitive with glass bottles, it is mandatory that the plastic bottles meet the requirements relating to volume stability which have been established for glass bottles and not be subject to distortion or expansion on storage.

It has been determined that articles molded from amorphous thermoplastic resins such as polystyrene, polyvinylchloride, polymethyl methacrylate and acrylonitrile copolymers may be stabilized to creep by heating the molded article at 1° to 20°C below the glass transition temperature of the amorphous resin for 0.5 to 24 hours, the time of heating being inversely proportional to the temperature of the heating.

The heating of articles fabricated from the amorphous thermoplastic resins below the glass transition temperature of the resin to improve the physical properties thereof is known to the art. For example, U.S. Pat. No. 2,373,093 (1945) teaches improving the stress crack resistance of articles molded from amorphous, thermoplastic resins by heating the article at a temperature between 5°-20°C below the glass transition temperature of the resin for 1-72 hours and then allowing the article to cool to room temperature.

The Journal of Applied Polymer Science, Vol. 11, pp. 1571-1579 (1967) and Vol. 14, pp. 2619-2628, 1970 discloses annealing amorphous polymers such as polycarbonate, polymethyl methacrylate, polystyrene and polyvinyl acetate at a temperature below the glass transition temperature of the polymer will improve the physical and mechanical properties of the polymers.

Although heating articles fabricated from amorphous thermoplastic resins below the glass transition temperature of the resin will stabilize the article to creep, such heating if the temperature is sufficiently high may cause undesirable side-effects such as discoloration of the resin. Therefore, it is highly advantageous in effecting creep stabilization to heat the article at the lowest possible temperature to avoid any undesirable side effects as well as the heating costs that are associated therewith.

A class of amorphous polymers that is finding increasing application for plastic bottle fabrication is thermoplastic polymers having a high nitrile monomer content in the order of 60% or more such as the copolymers of olefinically unsaturated nitriles such as acrylonitrile, methacrylonitrile and ethylenically unsaturated comonomers such as alkyl acrylates, styrene and graft copolymers of the nitrile copolymers with diene rubbers.

It has been unexpectedly discovered that when articles fabricated from the class of amorphous polymers having high nitrile content are exposed to humidifying conditions, the glass transition temperature of the polymer is lowered, thereby reducing the temperature at which the article is required to be heated to effect creep stabilization.

SUMMARY OF THE INVENTION

Articles fabricated from amorphous polymers having a nitrile monomer content of at least 60% having a first glass transition temperature and a moisture content of less than 1% may be stabilized to creep by humidifying the article until the article has a moisture content of at least 1% by weight, which causes the glass transition temperature of the nitrile polymer to be lowered to a second glass transition temperature and then heating the article while in a humidified state at a temperature of 1°-15°C below the second glass transition temperature to effect creep stabilization.

PREFERRED EMBODIMENTS

The class of nitrile polymers from which the articles treated in accordance with the present invention may be fabricated include those polymers prepared by polymerizing a major portion of an olefinically unsaturated nitrile and a minor portion of at least one other olefinically unsaturated monomer copolymerizable with the nitrile.

The olefinically unsaturated nitriles used to prepare the amorphous nitrile polymer are the alpha, betaolefinically unsaturated mononitriles having the structure

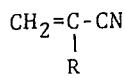

wherein R is hydrogen, a lower alkyl group having 1–4 carbon atoms or a halogen. Such compounds include acrylonitrile, alpha-chloroacrylonitrile, alpha-fluoroacrylonitrile, methacrylonitrile, ethacrylonitrile and the like. The most preferred olefinically unsaturated nitriles used in preparing the nitrile polymer are acrylonitrile and methacrylonitrile and mixtures thereof.

Exemplary monomers which can be copolymerized with the nitrile monomer include one or more unsaturated monomers such as the acrylate esters including methyl, acrylate, ethyl acrylate, the propyl acrylates, the butyl acrylates, the amyl acrylates, the hexyl acrylates, cyclohexyl acrylate, phenyl acrylate, the methacrylate esters such as methyl methacrylate, the butyl methacrylates, the amyl methacrylates, the hexyl methacrylates, cyclohexyl mechacrylate, vinyl esters such as vinyl acetate, vinyl propionate, vinyl butyrate, lower alpha olefins of from 2 to 8 carbon atoms, e.g., ethylene, propylene, isobutylene, butene-1, pentene-1, and their halogen and aliphatic substituted derivatives as represented by vinyl chloride, vinylidene chloride, etc; monovinylidene aromatic hydrocarbon monomers such as styrene, alpha methyl styrene, vinyl toluene, alpha chlorostyrene, ortho chlorostyrene, para chlorostyrene, meta chlorostyrene, ortho methyl styrene, para methyl styrene, ethyl styrene, isopropyl styrene, dichloro styrene, vinyl naphthalene.

Another group of comonomers suitable for use in the practice of this invention are vinyl ethers including vinyl methyl ether, vinyl ethyl ether, vinyl n-butyl ether, vinyl 2-chloroethyl ether, vinyl phenyl ether, vinyl isobutyl ether, vinyl cyclohexyl ether, p-butyl cyclohexyl ether, vinyl ether or p-chorophenyl glycol, etc.

The nitrile copolymers of the present invention generally contain about 60 to about 90 percent by weight of the nitrile monomer and about 10 to about 40 percent by weight of one or more other unsaturated monomers.

It is to be clearly understood that the process of the present invention can be utilized and is effective with any amorphous polymer having as its major constituent a nitrile monomer as hereinbefore defined. Thus, the process of the present invention is equally effective in the treatment of thermoplastic nitrile amorphous resins which include in the composition a synthetic or natural rubber component such as polybutadiene, isoprene, neoprene, nitrile rubbers, acrylonitrile-butadiene copolymers, ethylene-propylene copolymers, chlorinated rubbers etc. This rubbery component may be incorporated into the acrylonitrile containing polymer at a concentration of up to 25 percent by weight and preferably about 1 to about 20 percent by weight by any of the methods which are well known to those skilled in the art, e.g., direct polymerization of monomers, polyblends, grafting the acrylonitrile monomer mixture onto the rubber backbone, physical admixture of the rubbery component etc. Especially preferred are graft copolymers of a nitrile monomer and a second comonomer on a rubbery backbone of the type disclosed in U.S. Pat. No. 3,426,102 which are comprised of about 80 to 99 percent by weight of an olefinic nitrile/alkyl acrylate copolymer containing at least 60 percent by weight of the olefinic nitrile graft polymerized with 1 to 20 percent by weight of a diene-nitrile rubber.

The articles of the present invention such as containers may be fabricated from the amorphous nitrile polymer by any conventional molding means such as blow molding, extrusion blow molding being preferred. Such articles after fabrication generally contain less than 1 percent water.

In practicing the process of the present invention, articles molded from the nitrile polymer are allowed to cool to room temperature and are then subjected to a sequence of humidification and heat treatment steps to effect creep stabilization of the article.

Humidification is accomplished by the use of water vapor, steam or water. For best results, humidification is performed in an enclosed area so that the article is fully immersed in a cloud of vapor. The plastic article can be humidified for an unlimited length of time before the heat treatment step is affected, the minimum humidification time being sufficient to increase the moisture content of the plastic article to at least 1 percent by weight. A practical maximum time limit is that required for total moisture saturation of the plastic resin. The preferred moisture content induced by humidification is from about 1 percent by weight to saturation which is generally about 5 percent by weight. It has been found that for bottles fabricated from nitrile polymers having wall thicknesses of about 30 to 50 mils, a humidification time of about 0.5 to 48 hours is sufficient to give a moisture content of at least 1 percent by weight. If a stack of bottles is being humidified, more time will be required for the inner bottle to absorb a sufficient amount of moisture.

In the humidification of plastic bottles, the bottle wall surfaces will absorb limited amounts of moisture depending upon the temperature and relative humidity of surrounding medium. These factors can be taken into consideration in the humidification step however, immersion in a steam or water bath is most practical because temperature and relative humidity does not have to be measured.

In the creep stabilization of plastic bottles, the heating step as well as the humidification step can proceed immediately after forming of the bottles or at a later date, depending upon product requirements. As the bottle may be subject to moisture loss upon storage, it is highly desirable that the bottle be heat treated as soon as possible after being humidified.

The temperature at which the plastic bottle will be heated to effect creep stabilization will be determined by the extent of the humidification treatment. For a given nitrile polymer, the glass transition temperature of the polymer will be lowered inproportion to the moisture absorbed by the polymer. This can be readily ascertained for individual resin compositions by determining the glass transition temperature of the humidified resin at different moisture concentrations. For example, Barex 210 a commercially available nitrile polymerrubber graft polymer has a glass transition temperature of about 80°C. If film fabricated from the polymer is humidified to a moisture content of about 1 percent, the glass transition temperature is lowered to about 72°C, at 2.8 percent to 52°C. It is essential to the practice of the present invention that the humidified resin be heated at a temperature below that of the glass transition temperature of the humidified polymer which will always be below the glass transition temperature of the unhumidified resin. If the humidified resin is heated at a temperature below the glass transition temperature of the unhumidified polymer but above the glass transition temperature of the humidified polymer significant creep stabilization will not be imparted to articles fabricated from the resin and bottle distortion will occur.

To impart creep stability to the humidified article, the article should be heated at 1° to 15°C below the glass transition temperature of the humidified polymer for 0.5 to 24 hours, 1 to 3 hours being preferred The following examples will serve to further illustrate the invention.

EXAMPLE 1

Plaques of 35 mils thickness fabricated from Barex 210, a commercially available amorphous thermoplastic nitrile resin consisting of an acrylonitrile/methyl acrylate - acrylonitrile/butadiene graft copolymer containing about 69 percent acrylonitrile, 22 percent methyl acrylate and 9 percent butadiene rubber were dried in a vacuum oven at 80°C. The plaques were weighed and then placed in a water bath at 30°C for 4 to 120 hours. The plaques were removed from the bath and then reweighed to determine moisture absorption. The glass transition temperatures of the plaques were then determined by Differential Scanning Colorimetry using a Du Pont 900 Thermal Analyzer. The data obtained is summarized in the Table below.

TABLE

Glass Transition Temperature of Humidified Barex 210

| Immersion Time at 30°C, hours | Moisture Content, % Water Absorbed by Plaque | Glass Transition Temperature, °C |
|---|---|---|
| * | — | 79°C |
| 4 | 0.9 | 73° |
| 6 | 1.1 | 71° |
| 24 | 1.7 | 65° |
| 48 | 2.2 | 58° |
| 53 | 2.3 | 57° |
| 73** | 2.5 | 55° |
| 120 | 2.8 | 52° |

* Dry Plaque
** Obtained by Graph Plot of Data

EXAMPLE 2

Bottles having a weight of 40 grams and a volume of 10 ounces, extrusion blow molded from Barex 210 resin having a wall thickness of 37 mils were immersed in a water bath at 21°C for 3 days. It had been previously determined that 35 mil plaques of Barex 210 exposed to these same conditions had a moisture content of 1.9 percent and a glass transition temperature of 62°C.

The humidified test bottles were then placed in an air oven and heated at 60°C for 1 hour.

The test bottles were then filled with a commercial carbonated soft drink, charged with $CO_2$ to a pressure of 60 psig at 23°C and then stored at 100°F for 2 weeks.

The volume expansion or creep of the test bottles was determined by placing the bottles in a container containing water with a fixed filling level. The volume of water displaced by the test bottles in excess of that displaced by a standard or control bottle is a measure of the volume expansion which occurred during the 2 week storage time. It was determined by this creep test that the average volume expansion of the bottles was 32 mls.

As a control test, identical bottles which were filled and stored in the manner of example 2 but which were neither humidified or heat treated at 60°C before storage had an average volume expansion of 61 mls indicating that the humidification and heating sequence had caused a 47 percent reduction in creep.

By way of contrast, identical bottles which were filled and stored in the manner of example 2 but which were not humidified prior to being heat treated had an average volume expansion of 58 mls indicating that there had been a reduction in creep of only 5 percent.

EXAMPLE 3

The procedure of example 2 was repeated with the exception that the bottles were heat treated by immersing the bottles in a water bath at 55°C for 2 hours. The average reduction in volume expansion when compared to bottles which did not receive the heat treatment was 163 mls indicating a reduction in creep of 44 percent.

By way of contrast, bottles which were heat treated in the 55°C water bath for 2 hours, but which were not humidified at room temperature for 3 days exhibited an average reduction in volume expansion, when compared to bottles which did not undergo the heat treatment of 60 mls indicating a reduction in creep of only 16 percent.

What is claimed is:

1. A method for imparting volume stabilization to containers for pressurized liquids the walls of which are subjected to distortion by internal pressures exerted thereon by the pressurized liquid, the method comprising molding the container from an amorphous thermoplastic resin having a glass transition temperature $T_a$ and comprised of (1) about 60 to about 90 percent by weight of an alpha, betaolefinically unsaturated mononitrile having the structure

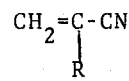

wherein R is selected from the group consisting of hydrogen, a lower alkyl group having 1 to 4 carbon atoms and a halogen and (2) about 10 to about 40 percent by weight of at least one other olefinically unsaturated monomer copolymerizable with the mononitrile, the molded container having a moisture content of less than 1 percent, humidifying the molded container to a moisture content of at least 1 percent to effect a decrease in the glass transition temperature of the resin to a lower glass transition temperature $T_b$, heating the container in the humidified state at a temperature 1° to 15°C below $T_b$ and then cooling the container to room temperature.

2. The method of claim 1 wherein the mononitrile is acrylonitrile.

3. The method of claim 1 wherein the olefinically unsaturated monomer is methyl acrylate.

4. The method of claim 1 wherein the olefinically unsaturated monomer is styrene.

5. The method of claim 1 wherein the resin is a graft copolymer of an acrylonitrile-methyl acrylate copolymer and an acrylonitrile-butadiene rubber.

6. The method of claim 1 wherein the container is humidified until the container has a moisture content of from about 1.5 to about 3 percent by weight.

* * * * *